United States Patent [19]

Spencer et al.

[11] 3,895,995

[45] July 22, 1975

[54] FILM DRYING OF HYDRATED ALKALI METAL SILICATE SOLUTIONS

[75] Inventors: Robert W. Spencer, Wallingford; Newton W. McCready, Newtown Square, both of Pa.

[73] Assignee: Philadelphia Quartz Company, Valley Forge, Pa.

[22] Filed: Jan. 18, 1971

[21] Appl. No.: 107,446

[52] U.S. Cl. ................................. 159/49; 23/302
[51] Int. Cl. ............................... B01d 1/22
[58] Field of Search ..................... 159/7–12, 45, 159/49; 23/293, 295, 293 A, 302, 110, 113, 110 A; 252/135

[56] References Cited
UNITED STATES PATENTS

| | | | |
|---|---|---|---|
| 1,403,556 | 1/1922 | Lihme | 159/49 |
| 2,131,718 | 9/1938 | McDaniel | 23/302 |
| 2,812,018 | 11/1957 | Heald et al. | 159/49 |
| 2,970,038 | 1/1961 | Hyde | 23/302 X |

*Primary Examiner*—Jack Sofer
*Attorney, Agent, or Firm*—Fred Philpitt; Ernest Posner

[57] ABSTRACT

Readily soluble, non-caking, hydrated alkali metal silicate particles are prepared by drying films of alkali metal silicate solutions. The conditions of dehydration, such as film thickness, temperature gradients throughout the film and the relative humidity of the air above the film are carefully controlled to obtain the product.

3 Claims, No Drawings

FILM DRYING OF HYDRATED ALKALI METAL SILICATE SOLUTIONS

INTRODUCTION

Powdered or granular hydrated alkali metal silicate products other than spray dried or crystallized materials have not been available as commercial products because of problems such as caking and poor solubility related to a lack of equilibrium in the moisture contained by the silicate or to incomplete hydration. Although the spray dried materials overcome these problems, they also have disadvantages; the particles produced are generally very small. If the preparation of large particles is attempted by spray drying, the particles are apt to be hollow microballoons that are very fragile and of very low bulk density. Such particles are unsuitable for shipping and handling, and for inclusion in most detergent formulations. While the water associated with hydrated crystalline silicates is fully equilibrated and they are readily soluble, have useful particle sizes and bulk densities, they are too alkaline for many applications and must be handled with care in many applications. Also, in household detergents, silicates with ratios of $SiO_2/Na_2O$ greater than ratios of the common crystallized silicates such as metasilicate, contribute to better detergency.

We have found a method to produce solid, hydrated amorphous alkali metal silicate products in which the moisture content is well equilibrated, with the product advantages which this allows. This method involves drying solutions of alkali metal silicate solutions under carefully controlled conditions, such as the film thickness, manner and rate of heating, and the relative humidity of the air above the film. The dried film is granulated and screened to obtain the product in the useful particle size range. These products are useful in many applications but particularly useful for inclusion in detergent formulations.

THE INVENTION

The solutions to be dried can be of any alkali metal silicate with a mole ratio of $SiO_2/M_2O$ of 1.5 to 5.0 in which M stands for an alkali metal or combinations of alkali metals. Most commonly, sodium or potassium silicate solutions are used but the method is useful for preparing mixed sodium-potassium silicates by drying a mixed solution. Examples of useful silicate solutions are:

| Sodium Silicate | Ratio $SiO_2/M_2O$ Wt. Ratio | Mole Ratio |
|---|---|---|
| B-W Sodium Silicate | 1.6 | 1.65 |
| RU Sodium Silicate | 2.4 | 2.47 |
| K Sodium Silicate | 2.9 | 2.99 |
| N Sodium Silicate | 3.2 | 3.30 |
| S 35 Sodium Silicate | 3.8 | 3.92 |
| Kasil No. 6 Potassium Silicate | 2.1 | 3.29 |
| Kasil No. 1 Potassium Silicate | 2.5 | 3.92 |

B-W, RU, K, N, S 35 and Kasil are registered trademarks of the Philadelphia Quartz Company. Alkali metal silicate solutions with $SiO_2/M_2O$ ratios greater than about 3.0 dehydrate easily and can be overdried to a state in which they do not dissolve readily or completely. Therefore these materials must be dried with caution. Alkali metal silicate solutions with $SiO_2/M_2O$ ratios less than 2.9 dehydrate less readily and are generally not prone to insoluble formation. However, the low ratio silicate must be dried carefully to prevent caking and sticking. The uniform drying of a layer or film of an alkali metal silicate solution involves several problems. If the surface dries too rapidly, it forms a hard film and/or a concentrated surface layer which inhibits further loss of water from the interior. Heating the interior water above its boiling point results in puffing and the product is quite full of bubbles or holes. Furthermore, if the water must diffuse through a layer of silicate some alkali may be carried with the water and result in an inhomogeneous product. Another problem is the adhesion of the dried film to the surface on which the silicate solution is spread. This is especially difficult if the interior surface becomes overheated. Furthermore, unless the product is dried homogeneously, portions of the film may be over-dried and be very brittle while other portions may be elastic and resist grinding.

In drying a thin film of alkali metal silicate solution it is extremely important that the rate of evaporation of water from the surface of the film does not exceed the water transfer within the film. Therefore, the factors that we control during the dehydration of the film contribute to this steady state between the water transfer in the film and the water evaporated from the surface of the film. One of the most important factors that must be controlled is the relative humidity of the air above the film. It is important to maintain the relative humidity of this air at a value roughly corresponding to the moisture content of the film. This arrangement results in decreased evaporation rate from the film surface helping to establish a steady state moisture transfer between the surface of the film and the bulk of the film. Without this humidity control, the evaporation of water from the surface of the film is always greater than the transfer of water within the film itself. Thus, a dried film produced without this humidity control tends to be too dry at the surface and too moist internally. The water contained by the ground product would not be well equilibrated, and the product would cake and have high content of very slowly soluble or even insoluble material.

Another factor that we control to promote the moisture transfer within the film is the manner, rate and extent of heating. The interior or bottom of the film should be heated so that the water transfer through the film to the surface is facilitated by convection as well as diffusion. The temperature of the film should not be raised too rapidly, that is the heat introduced should be controlled so that the alkali metal silicate solution does not dehydrate too rapidly causing strains and other disturbences of the film because of volume changes that accompany water loss. The boiling point of the alkali metal silicate solution should not be exceeded to prevent the formation of bubbles in the film. The boiling point of silicate solutions at 40 to 50% solids is about 102°C and this increases to about 133°C as the silicate is concentrated.

The film thickness required for this process can vary to some degree and depends somewhat on the ratio and the concentration of the silicate solution to be dried. However, the film should not be so thin that the danger of overdrying is acute and that the area needed to spread the film for drying is too large. The film should not be too thick since it is then difficult to set up the equilibrium relative to the water transfer through the film and the water evaporated from the surface. The grinding of a thick dried film is also difficult. We prefer a film thickness of 0.5 to 5 millimeters.

In general, the process for production of the desired hydrated product by thin film drying involves releasing a film of the alkali metal silicate solution at the highest concentration and temperature at which the required film can be formed. The film is formed at a constant thickness on a moving belt. The belt is heated from beneath while the surface is exposed to air of carefully controlled temperature and humidity. There may be a series of gradually increasing temperature and decreasing humidity ranges. After drying the film to the desired moisture content it passes to a cooling section where it is chilled until brittle and released from the belt, preferably by flexing. The product is then ground to the desired size. The air above the film should be conditioned to about 30% relative humidity. The temperature of the surface on which the film is cast should be about 100°C and may be raised slowly to about 130°C. The air above the film should be controlled to at least 10°C cooler than the surface on which the film is cast.

The ground product is a dense, free-flowing white powder. The powder is not sticky and does not cake indicating that the water is homogeneously distributed throughout the product. The product can be ground to any particle size but we prefer a 10 to 65 or 10 to 48 mesh size range. The products in this size range have bulk densities between 20 and 70 lbs/cu.ft. The moisture content of the product can be 10 to 30% and we prefer moisture contents of 18 to 27% for applications in which fast dissolving is required. These products are almost completely soluble in water; for example 5g of a sodium silicate with a weight ratio of 2.0 $SiO_2/Na_2O$ thin film dried to a water content of 20%, dissolved to the extent of 99.78% in 95g of water at 75°C, in 5 minutes.

These products are useful in detergent mixtures, in which they can be blended with other granular and optionally smaller amounts of liquid ingredients to furnish non-caking, non-segregating detergent formulations. They are particularly useful in dry blended detergents in which phosphates have been partially or completely replaced. In this formulation the silicate serves a number of functions. It is a detergent builder, corrosion control agent and it can hold additional water which facilitates the addition of other materials to the detergent in the form of solutions or aqueous dispersions. The hydrated silicate products are also useful in detergent formulation slurries to be spray dried, and in such diverse applications as water treatment, corrosion prevention brick manufacture, clay refining or ceramic and refractory binders where the use of a readily soluble silicate is needed but the convenience of a granular form rather than a liquid form is advantageous.

EXAMPLES

A further understanding of the invention can be obtained from the following illustrative examples which should not be considered restrictive or limiting.

EXAMPLE 1

A sodium silicate solution (3.4 lbs) with a ratio of 3.2 $SiO_2/Na_2O$ and 38.7% solids content was poured onto a pan lined with a hydrophobic, heat resistant plastic; the thin film product was 0.125 inches thick. The pan was placed in an oven at 95°C; air conditioned at 30% relative humidity was circulated over the film. The bottom of the film was heated with a hot plate and the temperature of the surface of the pan was increased gradually from 95°C to 130°C in 2 hours. The silicate now contained 76% solids. The pan and thin film were chilled. The solidified silicate was easily removed from the pan and could be readily ground. The ground product was screened to provide white granules of 10 to 65 mesh. The bulk density was 50 lbs/cu.ft. The product had a moisture content of 24%, and it dissolved rapidly with only 0.25% undissolved when 5g of the product was dissolved in 95g of water at 75°F for 5 minutes.

EXAMPLE 2

A sodium silicate solution with a ratio of 2.0 $SiO_2/Na_2O$ and 54% solids was subjected to the process of example 1. The film was dried to 81% solids in 2.5 hours. The bulk density of the 10 to 70 mesh fraction was 57 lbs/cu.ft. The white granular product had a moisture content of 19% and dissolved with only 0.1% insoluble under the test conditions described in example 1.

EXAMPLE 3

A potassium silicate solution with a weight ratio of 2.5 $SiO_2/K_2O$ and 29% solids was concentrated to 40% solids and subjected to the process of example 1. The film was dried to 83% solids in 2 hours. The bulk density of the 10 to 65 mesh fraction was 47 lbs/cu.ft. The white granular product had a moisture content of 17% and dissolved with only 0.15% insoluble under the test conditions described in example 1.

EXAMPLE 4

A solution of potassium silicate and sodium silicate with a combined mole ratio of 2.4 $SiO_2/M_2O$ and 45% solids was made by mixing equal amounts of 1.65 $SiO_2/Na_2O$ mole ratio sodium silicate and 3.29 $SiO_2/K_2O$ mole ratio potassium silicate at an elevated temperature. This mixed solution was subjected to the process of example 1. The film was dried to 78% solids in 1.8 hours. The bulk density of the 10 to 48 mesh fraction was 35 lbs/cu.ft. The white granular product had a moisture content of 22% and dissolved with only 0.12% insolubles in the test conditions described in example 1.

EXAMPLE 5

A sodium silicate solution with a ratio of 2.4 $SiO_2/Na_2O$ and a solids content of 54% was maintained at 90°C. The silicate was flowed onto a moving belt under a gate, thereby producing a film of 2 millimeters in thickness. The belt was coated with a hydrophobic plastic and the silicate did not adhere to it. The belt moved at a rate of 3 feet per minute and was covered with a hood for a distance of 60 feet that contained air at 95°C and relative humidity of 30 to 33%. Within this same distance the surface of the belt was heated at 95°C initially and then gradually increased to 130°C. the silicate film, at 23.5% moisture, was then chilled with blasts of cold air. The belt passed around a roller and the solid film fell off the belt. The product was jaw crushed and screened to obtain the 10 to 48 mesh fraction. The bulk density was 60 lbs/cu.ft. The white granular product dissolved with only 0.13% insoluble under the test conditions described in example 1.

EXAMPLE 6

A laundry detergent of the following composition was prepared using the product of example 5.

| | |
|---|---|
| Ultrawet(Anionic surfactant; Atlantic Chem. Corp.) | 20.0 pbw |
| Sodium tripolyphosphate | 45.0 |
| $Na_2CO_3$ | 24.0 |
| Hydrated sodium silicate of example 5 | 5.0 |
| Sodium carboxymethyl cellulose (Na CMC) | 1.0 |
| Blancophor RG (optical brightener; GAF Corp.) | 0.1 |
| Water | 5.0 |

The ingredients were mixed in a crutcher as a 60% solids slurry and spray dried. The product was free-flowing, non-caking, rapidly and completely soluble in water, and proved an effective laundering compound.

EXAMPLE 7

A dry blended laundry detergent of the following composition was prepared using the product of example 2.

| | |
|---|---|
| Triton X-100 (nonionic surfactant; Rohm & Haas Co.) | 12.0 pbw |
| Sodium boroglucoheptonate | 30.0 |
| Hydrated sodium silicate of example 2 | 15.0 |
| $Na_2CO_3$ | 35.0 |
| Na CMC | 1.0 |
| Blancophor RG (optical brightener; GAF Corp.) | 0.1 |
| Water | 7.0 |

The mix was easily prepared and was an effective laundry detergent which did not cake or show any other evidence that would indicate a lack of equilibrium in moisture content. The silicate did not segregate from the mixture.

EXAMPLE 8

An automatic home dishwasher detergent of low phosphate content was prepared using the product of example 2.

| | |
|---|---|
| Sodium tripolyphosphate | 33.0 pbw |
| Hydrated sodium silicate of example 2 | 54.8 |
| Sodium boroglucoheptonate | 5.5 |
| Triton CF-54 (nonionic surfactant; Rohm & Haas Co.) | 2.0 |
| CDB-60 (solid bleach, FMC Corp.) | 1.7 |
| Water | 3.0 |

The mixture was easily prepared and was effective in cleaning dishes. The mixture was not corrosive to metals in the dishwashing machine and did not attack the overglaze on fine china.

More or less detailed claims will be presented hereinafter and even though such claims are rather specific in nature those skilled in the art to which this invention pertains will recognize that there are obvious equivalents for the specific materials recited therein. Some of these obvious equivalents are disclosed herein, other obvious equivalents will immediately occur to one skilled in the art, and still other obvious equivalents could be readily ascertained upon rather simple, routine, noninventive experimentation. Certainly no invention would be involved in substituting one or more of such obvious equivalents for the materials specifically recited in the claims. It is intended that all such obvious equivalents be encompassed within the scope of this invention and patent grant in accordance with the well-known doctrine of equivalents, as well as changed proportions of the ingredients which do not render the composition unsuitable for the disclosed purposes. Therefore, this application for Letters Patent is intended to cover all such modifications, changes and substitutions as would reasonably fall within the scope of the appended claims.

What we claim is:

1. In the known process of drying an alkali metal silicate solution, including casting a thin film and drying with heat to obtain amorphous particles, the improvement to said process including the control of process conditions by:
   a. maintaining the surface upon which said film is cast at a temperature between 95° C and 136° C and below the boiling point of the alkali metal silicate solution,
   b. maintaining the air surrounding said film during the drying at 25 to 35% relative humidity, and
   c. maintaining the thickness of said film to be dried between 0.5 and 5.0 millimeters; whereby the product obtained from said process will be equilibrated with respect to the moisture content, said moisture content being 10 to 30% by weight, and have a bulk density of 20 to 70 lbs./cu.ft., and the product has an $SiO_2/M_2O$ mole ratio of 1.5 to 5.0/1.0.

2. The process of claim 1 wherein the alkali metal silicate solution is selected from the group consisting of sodium silicate, potassium silicate, and sodium-potassium double silicates.

3. The process of claim 1 wherein the film is dried to a moisture content of 18 to 27% on a weight basis.

* * * * *